US010272821B2

United States Patent
Kreisz et al.

(10) Patent No.: US 10,272,821 B2
(45) Date of Patent: Apr. 30, 2019

(54) CONTROL OF AT LEAST ONE LIGHTING MEANS OF A VEHICLE HEADLIGHT DEPENDING ON AN ELECTRICAL QUANTITY PROVIDABLE ON A VEHICLE HEADLIGHT CONNECTION OF A VEHICLE

(71) Applicant: OSRAM GmbH, Munich (DE)

(72) Inventors: Benjamin Kreisz, Herbrechtingen (DE); Manuel Maresch, Heuchlingen (DE); Sammr Nasrallah-Goldberg, Munich (DE); Marc Schwenkbeck, Winnenden (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 15/960,633

(22) Filed: Apr. 24, 2018

(65) Prior Publication Data

US 2018/0319318 A1 Nov. 8, 2018

(30) Foreign Application Priority Data

May 2, 2017 (DE) .................. 10 2017 207 346

(51) Int. Cl.
*B60Q 1/14* (2006.01)
*B60Q 1/00* (2006.01)
(Continued)

(52) U.S. Cl.
CPC ......... *B60Q 1/1415* (2013.01); *B60Q 1/0088* (2013.01); *B60R 16/033* (2013.01);
(Continued)

(58) Field of Classification Search
CPC .. B60Q 1/1415; B60Q 1/0088; B60Q 11/005; B60R 16/033; B60Y 2410/115
(Continued)

(56) References Cited

U.S. PATENT DOCUMENTS

2011/0062869 A1* 3/2011 Hsu ...................... B60Q 11/005
315/77

FOREIGN PATENT DOCUMENTS

AU 2002254895 B2 8/2006
DE 10107578 A1 8/2002
(Continued)

OTHER PUBLICATIONS

European Search Report based on application No. 18165703.2 (9 pages) dated Jul. 11, 2018 (for reference purpose only).
(Continued)

*Primary Examiner* — Daniel D Chang
(74) *Attorney, Agent, or Firm* — Viering Jentschura & Partner MBB

(57) ABSTRACT

A connection device for electrical connection of a lighting means of a vehicle headlight, includes a vehicle connection for connection to the vehicle headlight connection of the vehicle, a lighting means connection for the electrical coupling of the at least one lighting means of the vehicle headlight, an on-board power supply system connection for connection to an electrical on-board power supply system of the vehicle, a lighting means simulation unit connected to the vehicle connection and to the on-board power supply system connection to detect the electrical quantity and to simulate a predefinable lighting means taking account of the detected electrical quantity on the vehicle connection, and a control unit connected to the lighting means connection and to the on-board power supply system connection to determine a control signal depending on the detected electrical quantity and to control the lighting means depending on the determined control signal.

18 Claims, 6 Drawing Sheets

(51) Int. Cl.
 *B60R 16/033* (2006.01)
 *H05B 33/08* (2006.01)
 *B60Q 11/00* (2006.01)

(52) U.S. Cl.
 CPC .......... *H05B 33/089* (2013.01); *B60Q 11/005* (2013.01); *B60Y 2410/115* (2013.01)

(58) Field of Classification Search
 USPC ......................................................... 315/82
 See application file for complete search history.

(56) References Cited

FOREIGN PATENT DOCUMENTS

| | | |
|---|---:|---|
| DE | 10215472 A1 | 11/2003 |
| DE | 102008048197 A1 | 3/2010 |
| DE | 102009052690 B3 | 4/2011 |
| DE | 102012102638 A1 | 10/2013 |
| EP | 2000358 A1 | 12/2008 |

OTHER PUBLICATIONS

German Search Report based on application No. 10 2017 207 346.2 (9 pages) dated Nov. 23, 2017 (for reference purpose only).

\* cited by examiner

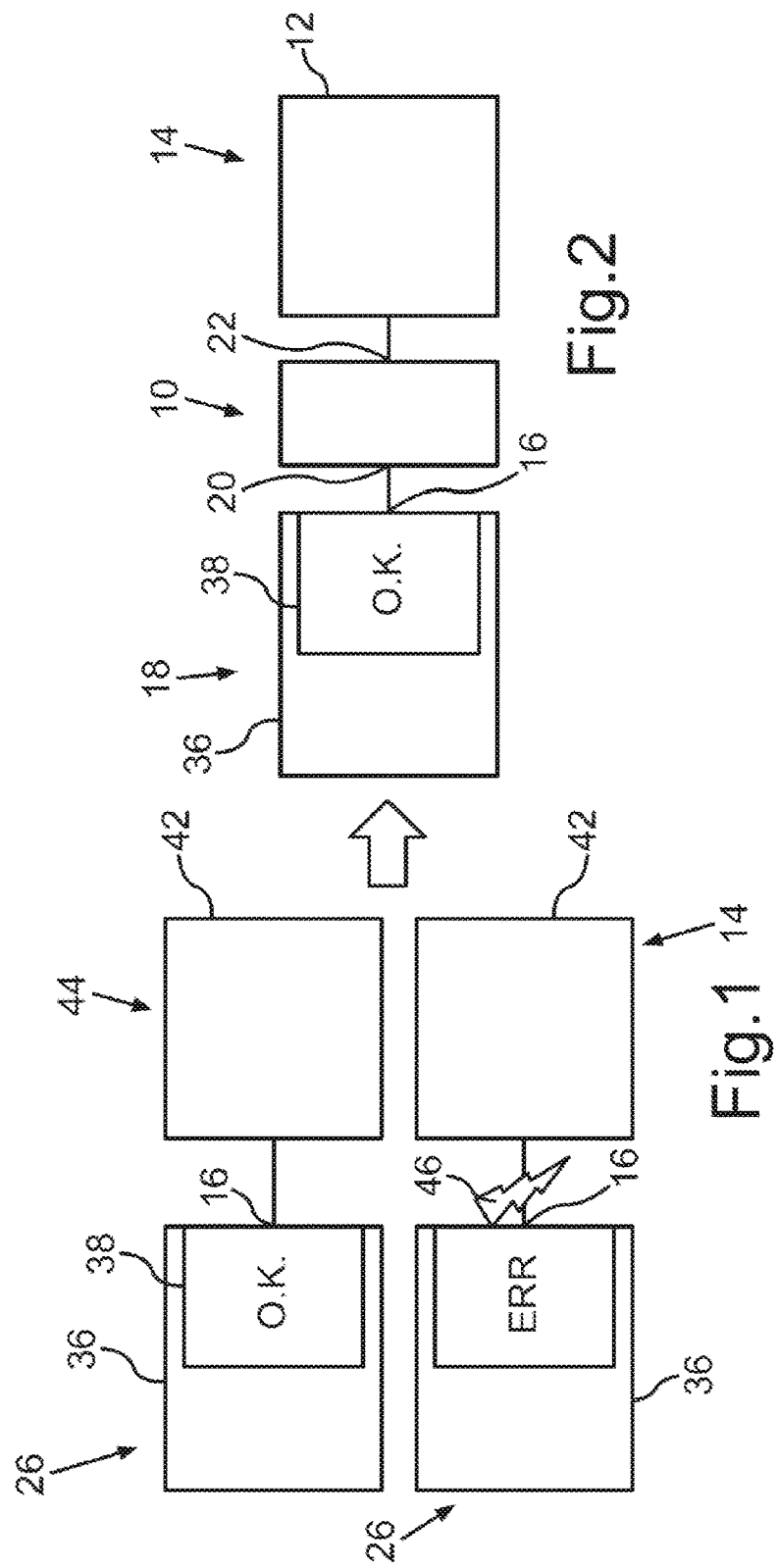

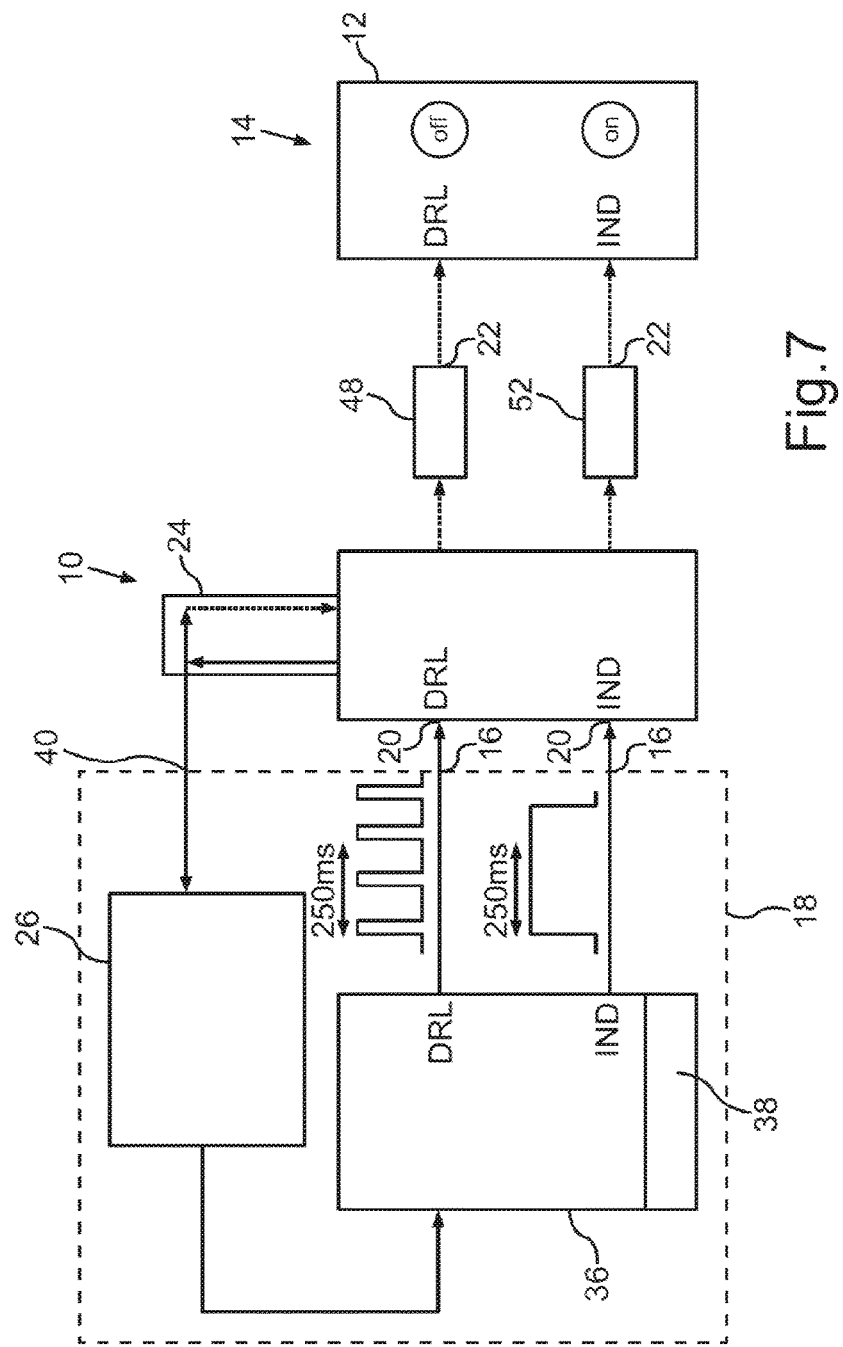

CONTROL OF AT LEAST ONE LIGHTING MEANS OF A VEHICLE HEADLIGHT DEPENDING ON AN ELECTRICAL QUANTITY PROVIDABLE ON A VEHICLE HEADLIGHT CONNECTION OF A VEHICLE

CROSS-REFERENCE TO RELATED APPLICATION

This application claims priority to German Patent Application Serial No. 10 2017 207 346.2, which was filed May 2, 2017, and is incorporated herein by reference in its entirety.

TECHNICAL FIELD

Various embodiments relate generally to a connection device for the electrical control of at least one lighting means of a vehicle headlight depending on an electrical quantity providable on a vehicle headlight connection of a vehicle. In addition, various embodiments relate to a vehicle headlight for connection to a vehicle headlight connection of a vehicle. Various embodiments furthermore relate to a vehicle with a vehicle headlight connected to a vehicle headlight connection of the vehicle and with an on-board power supply system. Finally, various embodiments also relate to a method for the electrical control of at least one lighting means of a vehicle headlight by means of a connection device electrically coupled to an on-board power supply system of a vehicle in which the at least one lighting means is controlled depending on an electrical quantity provided on the vehicle headlight connection of the vehicle.

BACKGROUND

Connection devices, vehicle headlights, vehicles and methods for controlling vehicle headlights are essentially extensively known, so that separate documentary evidence is not required in this respect. Modern vehicles have a monitoring device on board the vehicle which monitors a functionality of a connected vehicle headlight, e.g. its lighting means, during the intended operation of the vehicle. A monitoring function of this type is also prescribed in part by the standards, such as, for example ECE R 48 or the like. It is hereby achieved that, on the one hand, a vehicle driver can be informed of the functionality of the respective vehicle headlight or its lighting means and can initiate corresponding measures in the event of faults. In addition, it can be achieved that vehicle headlights which are not operable as intended or whose lighting means generate a message which can automatically initiate further measures, for example deactivation of a lighting means channel assigned to the respective lighting means, in order to be able, for example, to avoid hazardous states or the like.

The monitoring on board the vehicle is configured as adapted for the monitoring of an assigned lighting means. If a defect occurs in a lighting means of this type during intended operation, only a lighting means of identical design can be used for a repair or maintenance. Conversely, if a lighting means with differing, e.g. electrical, characteristics is used, this can be detected by the monitoring device as a fault due to differing electrical characteristics and a corresponding fault message or a corresponding fault signal can be emitted. In addition, in the worst case, the corresponding lighting means channel may even be completely deactivated if this is provided on board the vehicle. Even though the lighting means is intact, the intended lighting function cannot therefore be provided.

A problem of this type may also occur in the event of a modification of a vehicle headlight. If, for example, the monitoring device is configured for the functionality of an incandescent lamp as a lighting means, a connection of an LED-based lighting means, e.g. with and without luminescent material conversion, and/or a laser-diode-based lighting means which is equipped with a wavelength conversion element, for example in the form of a laser-activated remote phosphorus (LARP) light source, causes the monitoring device to determine a defective lighting means due to differing electrical characteristics and to initiate corresponding messages and functions, even though the LED-based and/or the laser-diode-based lighting means is able to provide the intended lighting function. The same applies accordingly also to a vehicle headlight which is equipped with a discharge lamp as the lighting means.

It would of course be possible to adapt the monitoring device of the vehicle accordingly. However, this is often possible only at considerable expense. In addition, this requires an intervention on board the vehicle, e.g. in the monitoring device, which additionally poses risks with regard to warranty. An intervention in the monitoring device is therefore to be avoided wherever possible, even if it could be implemented at reasonable cost.

SUMMARY

A connection device for electrical connection of a lighting means of a vehicle headlight, includes a vehicle connection for connection to the vehicle headlight connection of the vehicle, a lighting means connection for the electrical coupling of the at least one lighting means of the vehicle headlight, an on-board power supply system connection for connection to an electrical on-board power supply system of the vehicle, a lighting means simulation unit connected to the vehicle connection and to the on-board power supply system connection to detect the electrical quantity and to simulate a predefinable lighting means taking account of the detected electrical quantity on the vehicle connection, and a control unit connected to the lighting means connection and to the on-board power supply system connection to determine a control signal depending on the detected electrical quantity and to control the lighting means depending on the determined control signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows, in a schematic block representation, in an upper representation, an on-board power supply system of a vehicle (not shown in further detail) which in this case is an automobile to which a vehicle headlight is connected with a halogen lamp as the lighting means and, in a lower representation, the on-board power supply system as in the upper representation, wherein the lighting means of the vehicle headlight is formed here by an LED;

FIG. 2 shows a schematic representation as in the lower view according to FIG. 1, wherein the vehicle headlight is connected by means of a connection device according to various embodiments;

FIG. 7 shows a further design based on the design according to FIG. 4.

DESCRIPTION

Figure 3:
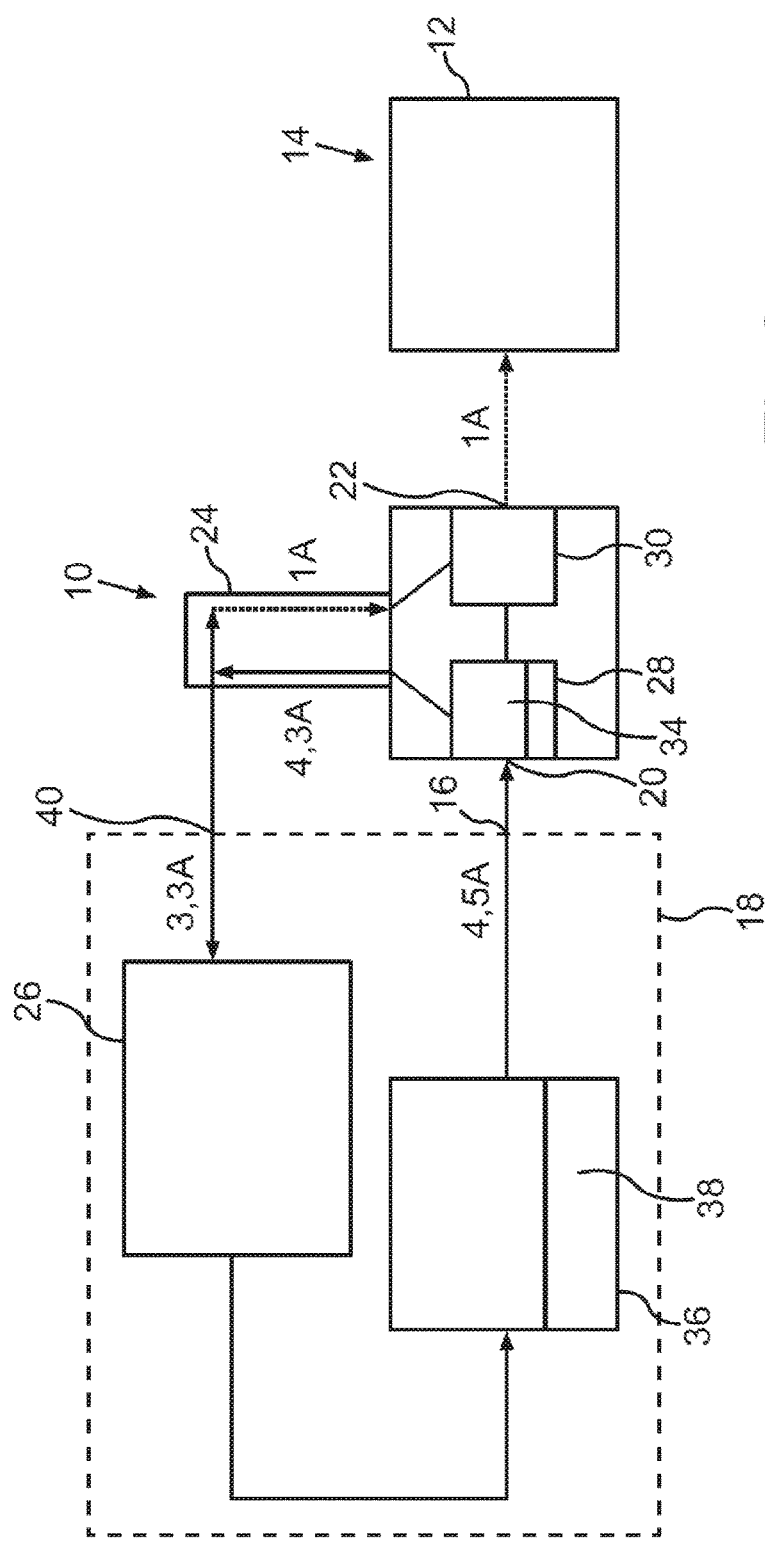
FIG. 3 shows a schematic block representation based on the circuit according to FIG. 2.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments tackle the problem of providing a facility for being able to connect vehicle headlights with the widest variety of lighting means to the operation on a predefined vehicle headlight connection of the vehicle without having to intervene in the control, e.g. the monitoring device, on board the vehicle.

Various embodiments may improve flexibility in respect of a vehicle headlight connectable to the vehicle headlight connection.

With regard to a generic connection device, it is proposed, for example, that said device has a vehicle connection for connection to the vehicle headlight connection of the vehicle, a lighting means connection for the electrical coupling of the at least one lighting means of the vehicle headlight, an on-board power supply system connection for connection to an electrical on-board power supply system of the vehicle, a lighting means simulation unit connected to the vehicle connection and to the on-board power supply system connection to detect the electrical quantity and to simulate a predefinable lighting means taking account of the detected electrical quantity on the vehicle connection and a control unit connected to the lighting means connection and to the on-board power supply system connection to determine a control signal depending on the detected electrical quantity and to control the lighting means depending on the determined control signal.

With regard to a generic vehicle headlight, it is proposed, for example, that said vehicle headlight has a connection device according to various embodiments.

With regard to a generic vehicle, it is proposed, for example, that the vehicle headlight is connected by means of a connection device according to various embodiments or the vehicle headlight is configured according to various embodiments.

On the method side, it is proposed, for example, that the electrical quantity is detected and a predefined lighting means is simulated taking account of the detected electrical quantity on the vehicle headlight connection, and a control signal is determined depending on the detected electrical quantity and the at least one lighting means is controlled depending on the determined control signal.

Vehicles, e.g. for road traffic, are normally motor vehicles, for example automobiles or the like. However, the vehicle may also be a trailer or a vehicle train consisting of a towing vehicle, which is normally a motor vehicle, and one or more trailers. In the case of a vehicle train, the towing vehicle and the trailers are coupled to one another. In this sense, a vehicle train may also be a trailer towed by a towing vehicle to which a further trailer is coupled.

Vehicles of this type require a vehicle headlighting which is defined in part by legal regulations. A proper lighting of the vehicle, inter alia, which requires, for example, an intended operation of corresponding vehicle headlights is thereby intended to be achieved. The vehicle headlights are connected to light connections of the vehicle for this purpose. The lighting means of the vehicle headlights are normally supplied with electrical power in the intended manner by the control device on board the vehicle via these vehicle connections so that the lighting means emit light in a predefined manner. The intended lighting function of the vehicle can thereby be achieved. As already explained above, the control device of the vehicle normally includes the monitoring device adapted to the respective lighting means, by means of which the intended operation of the respective lighting means of the respective vehicle headlight can be monitored.

By means of various embodiments, it is now possible to simulate the function of the respective lighting means on the vehicle connection which is electrically coupled to the vehicle headlight connection on board the vehicle and thereby simulate an intended operation in relation to the monitoring device of the vehicle. As a result, it is possible to operate a lighting means which differs from the lighting means provided on the monitoring device side in an intended manner. Various embodiments thus enables an adaptation to be carried out in this respect.

A respective functional state of the predefined lighting means can be determined from the electrical quantity which is provided on the vehicle headlight connection and the simulation can be adapted accordingly by means of the lighting means simulation unit so that a properly functional lighting means is detected by the control device of the vehicle or its monitoring device. The control signal which serves to operate the control unit is then determined from the detected electrical quantity. The control unit serves to control the lighting means of the vehicle headlight in accordance with the control device of the vehicle.

The predefinable lighting means is thus a lighting means according to whose functionality the monitoring device of the vehicle is adapted. The lighting means of the vehicle headlight may, however, differ herefrom. A decoupling is in fact provided in this respect by various embodiments, so that the actual electrical characteristics of the lighting means of the vehicle headlight are no longer relevant.

An electrical current, an electrical voltage, an electrical power, but also, for example, electrical quantities varying with time, e.g. a clocked electrical current, a clocked electrical voltage and/or the like can essentially be considered as the electrical quantity. If, for example, the electrical quantity is an electrical voltage which is provided by the control device of the vehicle or its monitoring device, a corresponding electrical current which would correspond to the intended operation of the predefined lighting means can be drawn from the vehicle connection by means of the lighting means simulation unit. It is thereby simulated to the upstream monitoring device of the vehicle that a functional, intended lighting means is present.

The lighting means simulation unit is connected to the on-board power supply system connection so that the electrical energy drawn from the vehicle headlight connection can also actually be drawn by means of the lighting means simulation unit. The electrical energy or the electrical power which is drawn from the vehicle headlight connection can be drawn off onto the on-board power supply system connection which is connected to the electrical on-board power supply system of the vehicle for this purpose. The electrical on-board power supply system of the vehicle may include an electrical energy store such as an accumulator or the like which is able to store the supplied electrical energy. Various embodiments thus enable the vehicle headlight connection to be operated or loaded independently from the lighting means actually present in the vehicle headlight.

The control unit is provided in order to be able to operate the lighting means actually present in the vehicle headlight in a suitable manner. From the electrical quantity detected by the lighting means simulation unit, said control unit determines a control signal which is used to control the lighting means. The control unit is coupled to the lighting means simulation unit via a communication link for this purpose. The control unit is similarly connected to the on-board power supply system connection for its intended purpose, so that it can draw the electrical energy or electrical power required for the intended operation from the on-board power supply system connection. The control unit has corresponding electrical setting means with which the lighting means of the vehicle headlight can be controlled according to the control signal. The lighting means can thereby be supplied with energy independently from a use of the vehicle headlight connection. The possibility of course exists for at least a part of the electrical energy or electrical power supplied by the lighting means simulation unit to the on-board power supply system connection to be used for the operation of the lighting means of the vehicle headlight.

The lighting means may have a lower energy requirement or a lower power requirement than the predefinable lighting means to which the monitoring device of the vehicle is adjusted. In addition, it can of course also be provided that the lighting means of the vehicle headlight has a greater energy requirement or a greater power requirement than the predefined lighting means. Various embodiments enable the creation of a wide-ranging design freedom here which enables the operation of the widest variety of light designs with the widest variety of lighting means without the need for intervention in the control device or its monitoring device on board the vehicle. The design according to various embodiments therefore also enables the subsequent integration of the widest variety of light designs with the widest variety of lighting means into already existing vehicle designs. Various embodiments are thereby suitable, for example, for the field of retrofitting or modification of already existing vehicles.

The vehicle headlight may be a front light, a rear light, a side light or the like. Combination designs are of course also possible. The light includes at least one lighting means, but may additionally also include two or more lighting means.

The lighting means may be of different types. A lighting means may, for example, be an incandescent lamp, one or more light emitting diodes (LED), an LARP light source, a gas discharge lamp, an OLED, an LED matrix light, an LED retrofit lamp, for example an OSRAM XLS LED lamp, combinations hereof or the like. If the vehicle headlight includes one or more lighting means, the lighting means may be provided for different intended lighting functions, such as, for example, for a driving light function such as a low beam, high beam and/or the like, and also a signal function such as an indicator light, a brake light and/or the like.

In one frequent application of various embodiments, the monitoring device of the vehicle is configured for the operation of incandescent lamps such as halogen lamps or the like and the vehicle headlight has an LED-based light source. The LED-based light source requires considerably less electrical energy or electrical power compared with the incandescent lamp for the same light power. A direct connection of a lighting means of this type to the vehicle headlight connection would therefore have the result that the monitoring device of the vehicle identifies an excessively low power level and therefore emits a fault message. In the worst case, it can be provided that the monitoring device completely deactivates the vehicle headlight connection, even though a functional vehicle headlight is connected. A corresponding adaptation can be achieved with various embodiments so that a reliable intended function can be implemented without intervention in the control device or monitoring device on board the vehicle.

The vehicle headlight connection includes at least one electrical connection, which may be configured in the form of a plug-in connection. This allows the vehicle headlight to be disconnected from the vehicle in a simple manner, for example if it needs to be exchanged due to damage, if a defective lighting means is to be exchanged or the like. The vehicle connection of the connection device is configured accordingly. A reliable electrical connection of the connection device to the vehicle or its on-board power supply system can be achieved with the vehicle connection, which may be configured as a corresponding plug-in connection.

The control device may be configured to monitor the intended function of the lighting means. To do this, the control unit may provide the same monitoring functionality as the monitoring device of the vehicle. The control unit can provide a corresponding monitoring signal according to the monitoring. The monitoring signal can be transmitted to the monitoring device or control device on board the vehicle. However, it can be provided that the monitoring signal is transmitted to the lighting means simulation unit which carries out the simulation of the predefined lighting means depending on the monitoring signal. It can thus be provided, for example if an electrical interruption of the lighting means is determined by the control unit, that a corresponding monitoring signal is transmitted to the lighting means simulation unit which then deactivates the current drain from the vehicle headlight connection of the vehicle. The monitoring device of the vehicle thereby obtains the facility to identify this fault accordingly and initiate a corresponding message or further activities. In this sense, the connection device of various embodiments thus functions bidirectionally, so that the lighting means of the vehicle headlight is not only controlled according to the electrical quantity present on the vehicle headlight connection, but corresponding fault functions which occur on the lighting means are also simulated accordingly on the vehicle headlight connection of the vehicle. As a result, a separate communication connection for communicating the functional state of the lighting means no longer needs to be provided.

The lighting means simulation unit may be connected exclusively to the vehicle connection of the connection device. The electrical energy or electrical power drawn from the vehicle headlight connection is thus fed entirely to the lighting means simulation unit or is absorbed and further processed by the latter. The vehicle headlight connection can thus essentially be loaded by the light simulation unit, e.g. independently from further consumers or units. This enables a particularly reliable functionality and additionally may also enable all fault functions which can be detected by means of the monitoring device of the vehicle to be provided in a simple manner, essentially without disruption. In various embodiments, no direct energy supply of the lighting means of the vehicle headlight is provided from the vehicle connection.

Depending on requirements, the lighting means connection can also be configured as an electrical, e.g. detachable, connection which can be electrically coupled in a suitable manner to the lighting means of the vehicle headlight. The electrical connection may be similarly configured as a plug-in connection. However, if the connection device is disposed as integrated into the vehicle headlight, the electrical connection may also be formed by a fixed electrical wiring or the like, which is not provided for the solution. In this case, a detachable electrical connection does not need to be provided. A corresponding provision can of course also be made in the case where the connection device is integrated into the vehicle headlight connection of the vehicle. This case may occur, for example, if an adaptation to different light designs is subsequently to be taken into account by the manufacturer.

The on-board power supply system connection may similarly be formed by an electrical plug-in connection. In addition, the possibility of course exists for the on-board power supply system connection to be formed by a prefabricated electrical cable which can be connected, for example, to the on-board power supply system in the vicinity of the accumulator, for example by means of suitable electrical connection technology such as clamping, crimping, screw connection or the like.

The lighting means simulation unit and also the control unit may be configured as an electronic hardware circuit. They may also at least partially include a program-controlled computer unit. The lighting means simulation unit furthermore may include a clocked energy converter, e.g. a DC/DC converter, by means of which a predefinable energy drain or power drain can be achieved on the vehicle connection. The correspondingly drained electrical energy or electrical power can then be fed once more at the on-board power supply system connection to the electrical on-board power supply system of the vehicle. As a result, this electrical energy or electrical power does not need to be converted into heat in an electrical consumer, such as an electrical resistor or the like, but can be made available for further use in the on-board power supply system of the vehicle. The clocked energy converter may be configured as adjustable for the purpose of the simulation. It can be controlled in a suitable manner by a converter control according to the detected electrical quantity. The lighting means simulation unit may have the clocked energy converter to simulate the lighting means.

The control unit furthermore includes an electronic adjustment means by means of which electrical energy or electrical power can be fed to the lighting means according to the control signal. For this purpose, the control unit may similarly have a clocked energy converter which draws electrical energy from the on-board power supply system connection and converts it in a manner suitable for the lighting means. The clocked energy converter may be similarly configured as adjustable and includes a converter control which is controllable by means of the control signal.

The control signal, in the same way as the monitoring signal, may be an analog or digital signal.

According to one development, it is proposed that the lighting means simulation unit has a first adjustment unit to adjust the simulation of the predefinable lighting means. The first adjustment unit may, for example, be a manual or an electronic adjustment unit. An adjustment knob, a switch and/or the like, by means of which an adjustment of the lighting means simulation unit can be performed according to the predefinable lighting means may be provided as a manual adjustment unit. This design is suitable, for example, for the case of retrofitting or modification. The first adjustment unit may of course essentially also be provided for an electronic control. For this purpose, the first adjustment unit may have a communication connection for the communication-based coupling of an adjustment device, e.g. a mobile communication terminal device such as a Smartphone, a laptop or the like.

It is furthermore proposed that the control unit has a second adjustment unit to adjust the control unit in relation to an intended operation of the lighting means. It is thus possible to be able to adapt the control unit in a suitable manner according to the lighting means actually present in the vehicle headlight. A manual adjustment facility by means of a rotary knob, a switch or the like can also be provided here. In addition, the possibility exists here also of providing an electronic adjustment which, as in the case of the first adjustment unit, can be performed by means of a communication terminal device. A combination in respect of the adjustment can of course also be provided.

However, various embodiments are not limited to the vehicle headlight having only a single lighting means and to the vehicle headlight connection being configured only for the connection of a single lighting means. It may in fact also be provided that the vehicle headlight connection is configured to be connected to a vehicle headlight with a plurality of lighting means. For this case, it is preferably proposed that the vehicle connection has a plurality of lighting means channels which are separated from one another and e.g. correspond accordingly to lighting means channels provided on the vehicle headlight connection. The lighting means simulation unit is configured accordingly to detect respective electrical quantities for each of the lighting means channels on the vehicle connection and to simulate respectively predefined lighting means on the respective lighting means channels taking account of the respective detected electrical quantities. It can thus be provided that the vehicle headlight connection is configured for the connection of a vehicle headlight which provides an indicator function, a position light function, a low beam function and a high beam function with different lighting means. Lighting means channels which can be assigned to the respective predefinable lighting means are accordingly present. It can be achieved with various embodiments that a plurality of corresponding predefinable lighting means can be simulated, e.g. independently from one another. Various embodiments simultaneously enable the vehicle headlight and here, for example, its lighting means or, if a plurality of lighting means are present, the plurality of lighting means to be controlled in a corresponding manner.

It can be provided, for example, that a corresponding lighting means is present in the vehicle headlight for each predefinable lighting means. The control may then be effected in a correspondingly assigned manner. However, it can also be provided that the lighting means of the light is suitable for implementing two or more of the lighting functions with a single lighting means. In this case, a corresponding control of the lighting means of the vehicle headlight can then be implemented by means of the control unit, in fact depending on not only a single electrical quantity of a single one of the lighting means channels, but on a corresponding plurality of electrical quantities of the respective different lighting means channels. This design may be suitable for use in pixel lights which are equipped as lighting means, for example, by means of matrices of LEDs, a laser scanner or the like.

If the vehicle headlight has more than one lighting means, the connection device can have a separate lighting means connection controllable by means of the control unit for e.g. each lighting means of the vehicle headlight which is to be controlled. The lighting means can thereby be controlled in a simple manner independently from one another.

Various embodiments additionally enable the operation in an intended manner of lighting means which are entirely different in terms of electrical characteristics also. It is thus possible with various embodiments for the control unit to be configured to operate a gas discharge lamp in the vehicle headlight as the lighting means in the intended manner, even if the vehicle headlight connection is designed for the operation of an incandescent lamp. Special electrical requirements should be met, e.g. for the start-up of the gas discharge lamp, but said requirements could not be fulfilled in the aforementioned case by means of a direct connection to the vehicle headlight connection. An adaptation in this respect can be achieved with various embodiments. It is thus possible for the control unit to provide a corresponding ignition voltage with which it is possible to ignite the gas discharge lamp. In addition, the control unit can preferably be configured to take account of the corresponding electrical characteristics following the ignition of the gas discharge lamp.

It may be proposed that the control of the lighting means is delayed at least partially for a predefinable time duration depending on the determined control signal. This design enables the elimination of specific testing functions which would not interfere with the operation of the predefinable lighting means, but could result in faults during the operation of the lighting means of the vehicle headlight. For example, the short test pulses normally provided for the monitoring of incandescent lamps can be eliminated as a result. A test pulse is the transient application of a voltage, wherein said voltage is normally applied for less than 200 ms. A single test pulse can be emitted for the check, or a plurality of test pulses can also be emitted in succession, e.g. in the aforementioned time period. The delay time may, for example, be in the range from a few milliseconds up to, for example, 0.5 seconds. The time duration may be up to around 0.25 seconds, e.g. up to around 0.2 seconds.

It is furthermore proposed that the detected electrical quantity is filtered. This design enables the achievement of a reliable detection for controlling the lighting means simulation unit and also the control unit, depending on the type of the electrical quantity. This may be provided, for example, if a brightness control is provided for the predefinable lighting means by means of a clocking such as pulse width modulation (PWM). With a control of this type, it may of course occur that the corresponding quantity unfiltered could hinder a reliable operation of the lighting means of the vehicle headlight. This can be avoided by means of the filtering. The filtering may be achieved, for example, by means of a temporal integration or the like. A low-pass function may be provided accordingly.

The predefined lighting means may be simulated by means of an electrical current. This electrical current is provided on the vehicle connection of the connection device and thus acts on the vehicle headlight connection in the connected state. A corresponding current is thereby applied to the vehicle control or the monitoring device of the vehicle. Since the on-board power supply system is normally operated with an essentially constant electrical voltage, the electrical power can also be used as an alternative. The use of the electrical current to simulate the predefined lighting means is therefore a particularly simple implementation for various embodiments. In various embodiments, this development is suitable in combination with an electrical voltage as the electrical quantity.

In addition, it may be provided if the electrical current is detected, compared with an optionally predefined comparative value and the electrical current is adjusted depending on the comparison. A regulation can thereby be provided by means of which the electrical current can be reliably adjusted to the desired value which would correspond to the predefinable lighting means. The comparative value thus provides a target quantity which is assignable to the predefinable lighting means. The connection device can thereby be adapted in a simple manner to the widest variety of predefinable lighting means. The comparative value simply has to be predefined according to the respective predefinable lighting means to which the monitoring device of the vehicle is adjusted. The electrical current itself can be detected by means of a shunt or in a contactless manner by means of a suitable current converter or the like. The connection device, e.g. the lighting means simulation unit, is equipped with a regulating unit by means of which the desired function can be implemented.

The comparative value and the first and/or second adjustment unit can be adjusted by means of an external communication terminal device.

The effects indicated for the connection device according to various embodiments apply equally to the vehicle headlight equipped with the connection device and to the vehicle equipped with the connection device, and also to the method according to various embodiments and vice versa. Method features can therefore also be indicated for device features and vice versa.

FIG. 1 shows, in an upper representation, an on-board power supply system 26 of an automobile (not shown in further detail) as the vehicle. The on-board power supply system 26 includes a control device 36 on board the vehicle by means of which, inter alia, at least one vehicle headlight 44 is controllable. The vehicle headlight 44 has a halogen lamp 42 as the lighting means.

The vehicle headlight 44 is connected to a vehicle headlight connection 16 of the vehicle. The intended function of the vehicle headlight connection 16 is monitored by means of a monitoring device 38 adapted to the halogen lamp 42. If a fault occurs in the halogen lamp 42, this can be detected with the monitoring device 38 and the monitoring device 38 emits a corresponding fault message. The fault message is then displayed, for example, in the vicinity of a cockpit for the driver of the vehicle.

In addition, the monitoring device 38 is coupled to the control device 36 and supplies the message signal simultaneously to the control device 36 also. As soon as the fault signal of the monitoring device 38 reaches the control device 36, the latter switches off the vehicle headlight 44 and/or the relevant at least one function of the vehicle headlight 44 accordingly.

The monitoring device 38 monitors an electrical current here which flows via the vehicle headlight connection 16 to the halogen lamp 42 due to an electrical voltage on the vehicle headlight connection 16, by means of a current sensor (not shown).

The on-board power supply system 26 is shown in a lower representation as in the upper representation and also has the same functions. In contrast to the upper representation, a vehicle headlight 14 which has an LED-based lighting means 12 is connected instead of the vehicle headlight 44 in the lower representation.

As is generally known, an LED-based lighting means requires a considerably lower current than the halogen lamp 42 for a comparable light power. Consequently, a considerably lower current will flow through the vehicle headlight connection 16 when the vehicle headlight 14 is activated. The monitoring device 38 identifies this and detects this as a fault. The monitoring device 38 emits its fault message accordingly in the form of a fault signal. The control device 36 then switches off the vehicle headlight 14 and/or the relevant at least one function of the vehicle headlight 44. The fault is indicated in the lower representation with the symbol 46.

Although the vehicle headlight 14 is fully functional, this is not detected by the monitoring device 38 and instead a fault is identified, even though no fault is actually present.

The possibility of adapting the monitoring device 38 according to the lighting means 12 should essentially now exist. However, this requires an intervention in the monitoring device 38 or the control device 36 on board the vehicle. In many cases, an intervention of this type is not possible or at least results in further faults in the intended operation of the vehicle. Consequently, an intervention in the monitoring device 38 and also in the control device 36 of the vehicle is normally ruled out.

FIG. 2 now shows a solution to the problem which was explained with reference to the lower representation in FIG. 2. It is evident from the schematic block representation according to FIG. 2 that a connection device 10 according to various embodiments is connected between the vehicle headlight connection 16 and the vehicle headlight 14. A corresponding adaptation can be carried out with the connection device 10 so that, from the perspective of the monitoring device 38, a functionality of a halogen lamp 42 as a predefinable lighting means is simulated, even though the vehicle headlight 14 is actually connected to the LED-based lighting means 12. The previously described fault which is denoted by the symbol 46 can thereby be avoided. The connection device 10 thus enables an intended operation of the vehicle headlight 14 on the vehicle headlight connection 16 without intervention in the monitoring device 38 or the control device 36 of the vehicle.

FIG. 3 shows, in a schematically detailed block representation based on FIG. 2, the functionality which is provided with the connection device 10 according to various embodiments so that the intended operation of the vehicle headlight 14 on the vehicle headlight connection 16 in conjunction with the monitoring device 38 is enabled.

It is evident from FIG. 3 that the vehicle which is denoted here with the reference number 18 includes the on-board power supply system 26 and the control device 36 with the monitoring device 38. In addition, the vehicle 18 includes the vehicle headlight connection 16. The vehicle 18 furthermore includes a vehicle on-board power supply system connection 40 which is electrically connected to the on-board power supply system 26. The on-board power supply system 26 includes a battery in the form of an accumulator (not shown in further detail) by means of which an on-board power supply system DC voltage (not described in further detail) is provided.

It is evident from FIG. 3 that the connection device 10 has a vehicle connection 20 for connection to the vehicle headlight connection 16 of the vehicle 18 and a lighting means connection 22 for the electrical coupling of the lighting means 12 of the vehicle headlight 14. Here, the lighting means 12 is the LED-based lighting means 12. The connection device 10 furthermore includes an on-board power supply system connection 24 for connection to the electrical on-board power supply system of the vehicle 18, here to the vehicle on-board power supply system connection 40.

The connection device 10 furthermore includes a lighting means simulation unit 28 connected to the vehicle connection 20 and to the on-board power supply system connection 24 to detect the electrical voltage as the electrical quantity and to simulate a predefinable lighting means, here the halogen lamp 42, taking account of the detected electrical voltage on the vehicle connection 20. The electrical voltage on the vehicle connection 20 corresponds to the electrical voltage which is provided by the control device 36 or the monitoring device 38 on the vehicle headlight connection 16.

The lighting means simulation unit 28 is configured here to produce, on the basis of the detected electrical voltage on the vehicle connection 20 of the connection device 10, a corresponding current flow through the vehicle connection 20 and therefore consequently through the vehicle headlight connection 16 also. If the vehicle headlight 14 is therefore switched on by means of the control device 36, this is determined by detecting the corresponding electrical voltage on the vehicle connection 20 by means of a voltage sensor and a corresponding current flow is produced by means of the lighting means simulation unit 28.

In FIG. 3, the current on the corresponding connection is indicated as 4.5 A. Even though no halogen lamp such as the halogen lamp 42 is present in the circuit according to FIG. 3, a corresponding current flow is produced on the vehicle headlight connection 16 so that the monitoring device 38 detects a functional halogen lamp 42. The intended function is thus retained on board the vehicle.

The current flow on the vehicle connection 20 and therefore also on the vehicle headlight connection 16 produced by means of the lighting means simulation unit 28 requires the circuit to be closed. The lighting means simulation unit 28 is connected to the on-board power supply system connection 24 for this purpose. The current present on the vehicle connection 20 can thus be fed back via the on-board power supply system connection 24 into the on-board power supply system 26, in fact via the on-board power supply system connection 24 and the vehicle on-board power supply system connection 40.

In order to then be able to operate the vehicle headlight 14 in a correspondingly intended manner, the connection device 10 according to various embodiments has a control unit 30 which is connected to the lighting means connection 22 and to the on-board power supply system connection 24. A communication link simultaneously exists between the control unit 30 and the lighting means simulation unit 28. The electrical voltage which has been detected on the vehicle headlight connection 16 or on the vehicle connection 20 is thus available in the control unit 30 as the detected electrical quantity. A control signal which serves to control the LED-based lighting means 12 depending on the determined control signal is determined by means of the control unit 30 depending on the detected electrical voltage. With the connection device 10, it is thus possible not only to simulate the halogen lamp 42 on board the vehicle, but also to control the LED-based lighting means 12 of the vehicle headlight 14 accordingly. The connection device 10 is thus interposed between the vehicle headlight connection 16 and the vehicle headlight 14 so that it performs an adaptation.

So that the control device 36 can operate the LED-based lighting means 12 in the intended manner, it is similarly connected to the on-board power supply system connection 24. The control unit 30 can thereby draw electrical energy from the on-board power supply system 26 in order to be able to operate the vehicle headlight 14 or its LED-based lighting means 12 in the intended manner.

Since the lighting means simulation unit 20 and the control unit 30 are both connected together to the on-board power supply system connection 24, a part of the current provided by the lighting means simulation unit 28 can of course also be used on the on-board power supply system connection 24 by the control unit 30 to operate the vehicle headlight 14 or its LED-based lighting means 12. Corresponding current data are indicated in FIG. 3, relating to the replacement of a halogen lamp with a power of around 55 W and an LED-based lighting means with a power of around 12 W. The current strengths and powers indicated in FIG. 3 result from a detected electrical voltage of around 12 V.

It is evident from FIG. 3 that a current of 4.5 A flows on the vehicle headlight connection 16 or on the vehicle connection 20. The lighting means simulation unit 28 supplies a current of 4.3 A on the on-board power supply system connection 24 in order to be able to supply the lighting means simulation unit 28 and, where appropriate, further units of the connection device 10, e.g. the control unit 30, accordingly with electrical energy for their intended operation. A current of around 1 A, which is essentially made available to the LED-based lighting means 12 also, is drawn accordingly from the on-board power supply system 26 by means of the control unit 30. As a result of the overlay of the two currents on the on-board power supply system connection 24, only a current of 3.3 A flows from the on-board power supply system connection 24 to the vehicle on-board power supply system connection 40.

As a result of the aforementioned currents, the connection device 10 can couple the vehicle headlight 14 to the vehicle headlight connection 16 with an efficiency of around 95%.

Figure 4:
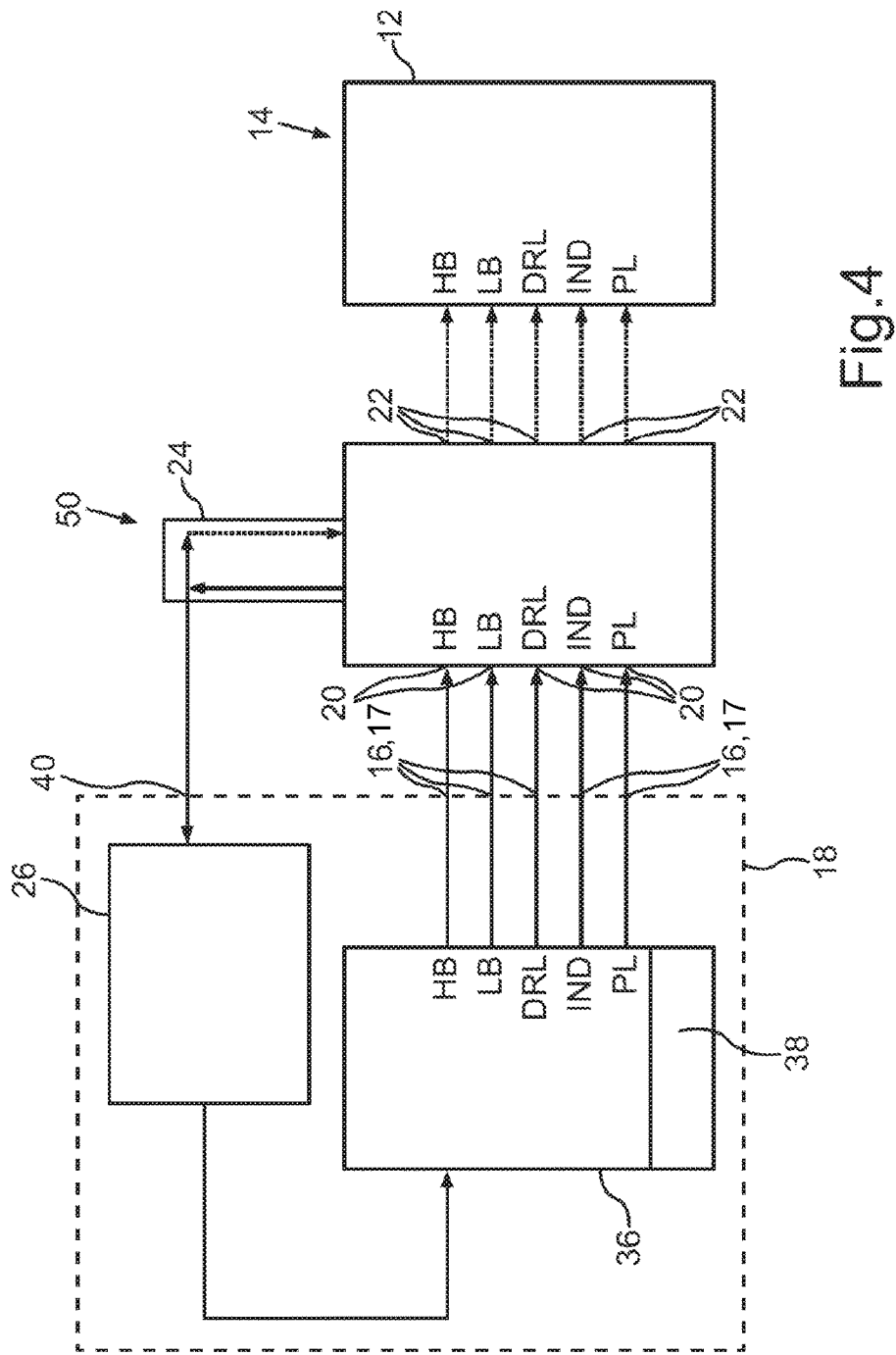
FIG. 4 shows a further schematic block representation of a further design according to various embodiments in which the vehicle headlight has a plurality of lighting means.

FIG. 4 shows a further design according to various embodiments which is based on the design according to FIG. 3. In contrast to FIG. 3, it is provided in the design according to FIG. 4 that the vehicle headlight 14 has five LED-based lighting means 12 here. These are denoted in FIG. 4 with HB (high beam), LB (low beam), DRL (day time running light), IND (indicator) and PL (position light). The connection device 10 according to FIG. 3 is replaced here accordingly with a connection device 50 according to FIG. 4. A separate independent lighting means channel 17 is provided for each of the aforementioned lighting means, said channel 17 providing a respective vehicle headlight connection and a respective vehicle connection on the connection device 50 which are electrically coupled to one another in a corresponding manner. On board the vehicle, the control device 36 is configured to control these lighting means in the form of incandescent lamps. All lighting mean channels 17 are monitored in a corresponding manner by means of the monitoring device 38.

In order to be able to implement the intended function in this case also, the connection device 50 has a respective lighting means simulation unit for each of the lighting means channels 17 which is individually assigned to the respective lighting means channel 17. The respective current strength can thereby be provided on the respective vehicle headlight connection 16. The provided currents are fed back via the on-board power supply system connection 24 and the vehicle on-board power supply system connection 40 to the on-board power supply system 26. The control unit 30 is configured accordingly in the case of the connection device 50 to control the five lighting means channels 17 of the vehicle headlight 14. Individually controllable lighting means channels 17 to which the respectively allocated LED-based lighting means of the vehicle headlight 14 are connected are provided accordingly. For each of these channels 17, the functionality corresponds to the functionality already explained with reference to the example embodiment shown in FIG. 3, and for that reason reference is additionally made to the corresponding descriptions.

The possibility of course essentially also exists for the vehicle headlight 14 to have only some of the lighting means as LED-based lighting means, for example in an inorganic or organic design, and other of the lighting means in turn as incandescent lamps or halogen lamps or discharge lamps. In this case, the connection device 50 is to be adapted accordingly. It may even be provided that a corresponding lighting means simulation unit and a corresponding control unit are not provided for this design, but instead the respective lighting means channel is simply looped through by the connection device.

It is furthermore evident from FIG. 3 that the lighting means simulation unit 28 has a clocked energy converter 34 by means of which the desired current flow can be implemented on the vehicle connection 20 or on the vehicle headlight connection 16 for the purposes of the simulation. The clocked energy converter 34 is configured here as a DC/DC converter. Its output can be adjusted as required by means of a suitable adjustment element so that the predefinable lighting means can be simulated in the desired manner by means of the lighting means simulation unit 28. A corresponding adjustment facility is shown with reference to FIG. 5.

Figure 5:
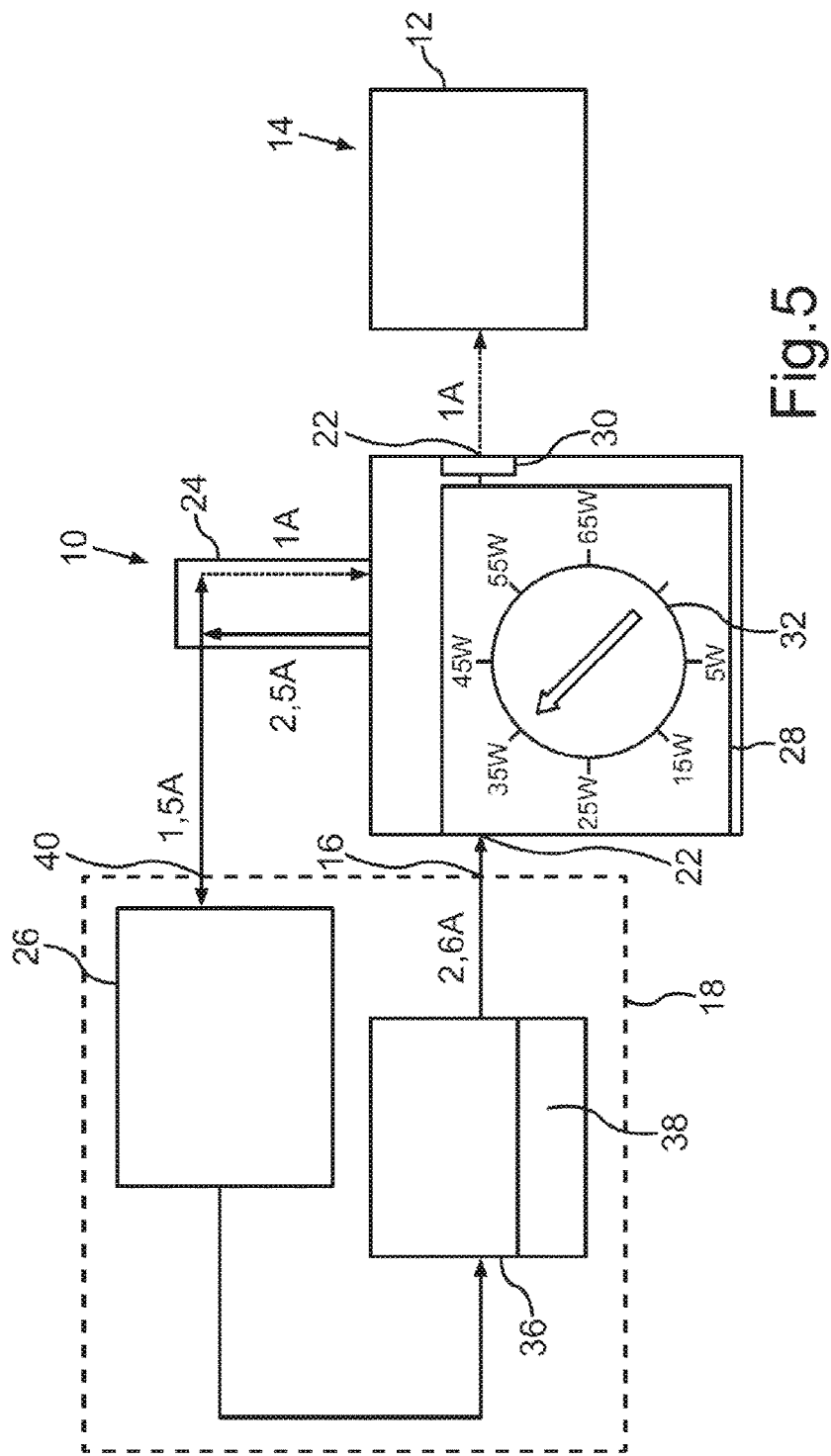
FIG. 5 shows a representation as in FIG. 3, in which the connection device is adjusted in respect of the simulation by means of an adjustment element to a first power.

FIG. 5 shows, in a schematic representation, a block representation as in FIG. 3, but in which the lighting means simulation unit 28 has an adjustment unit 32 as a first setting unit in the form of a rotary knob by means of which the power converted by means of the clocked energy converter 34 can be adjusted. In the adjustment shown in FIG. 5, the clocked energy converter 34 is adjusted to convert a power of 35 W. The adjusted current strengths are shown in FIG. 5. The adjustment by means of the adjustment element 32 which provides the first adjustment unit is selected on the basis of the predefinable lighting means. The predefinable lighting means is the lighting means to which the monitoring device 38 of the vehicle is adjusted. In the present design according to FIG. 5, this is a halogen lamp with a power of 35 W. The power of the clocked energy converter 34 is adjusted accordingly by means of the adjustment element 32, similarly to 35 W. A reliable simulation and therefore a reliable operation are thereby guaranteed.

Figure 6:
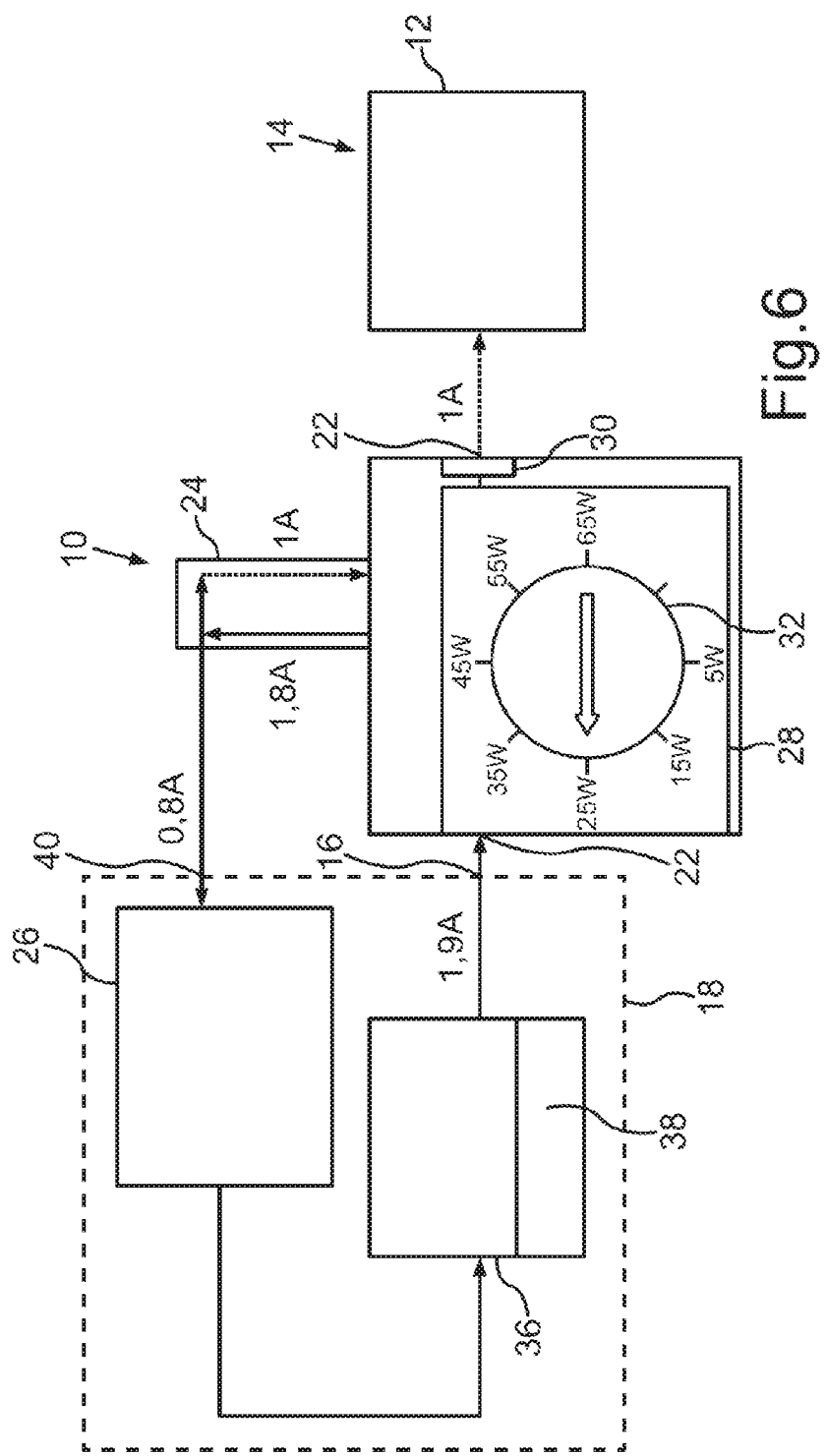
FIG. 6 shows a representation as in FIG. 5, wherein the adjustment element is adjusted to a second power.

FIG. 6 shows a further design based on the design according to FIG. 5, and for that reason reference is additionally made to the corresponding descriptions. FIG. 6 shows the effect of the adjustment element 32 by means of which the connection device 10 can also be adapted in a simple manner to a different required simulation or to a different predefinable lighting means. In the design according to FIG. 6, it is provided that the monitoring device 38 is configured for a halogen lamp with a power of 25 W. The power of the clocked energy converter 34 is adjusted accordingly to 25 W with the adjustment element 32 so that a suitable simulation can be provided by the connection device 10. A reliable adaptation of the simulation to the monitoring device 38 can thus be achieved independently from the vehicle headlight 14 over virtually the entire adjustment range which is possible with the clocked energy converter 34.

FIG. 7 shows a further design based on the design according to FIG. 4, and for that reason reference is additionally made to the corresponding descriptions. In FIG. 7, two of the LED-based lighting means 12, i.e. the DRL and the IND, are selected as an example. On board the vehicle, the control device 36 is configured to test the function of the lighting means 12 by means of a test pulse.

Test pulses normally have a duration of less than 200 ms. Traditional light sources such as halogen lamps do not respond to these short test pulses, but would briefly flash. The connection device has delay units 48, 52, as a result of which present signals which are present for less than a specific duration, in this example 250 ms, are ignored because they are identified as test pulses. The corresponding lighting is switched on only if signals are present for longer than this minimum time. In this case, the DRL is not activated, but the IND is activated as a result.

Even if, in the embodiments discussed above, the power of the lighting means 12 was less than the power of the predefinable lighting means to which the monitoring device 38 is adjusted, the opposite may of course also apply. Additional energy is then drawn accordingly from the on-board power supply system 26 via the vehicle on-board power supply system connection 40 and the on-board power supply system connection 24 of the connection device.

The embodiments serve merely to explain various embodiments and are not intended to limit it.

LIST OF REFERENCE SIGNS

10 Connection device
12 Lighting means
14 vehicle headlight
16 vehicle headlight connection
18 Vehicle
20 Vehicle connection
22 Lighting means connection
24 On-board power supply system connection
26 On-board power supply system
28 Lighting means simulation unit
30 Control unit
32 Adjustment element
34 Energy converter
36 Control device
38 Monitoring device
40 Vehicle on-board power supply system connection
42 Halogen lamp
44 vehicle headlight
46 Symbol
48 Delay unit
50 Connection device
52 Delay unit While various embodiments have been particularly shown and described with reference to specific embodiments, it should be understood by those skilled in the art that various changes in form and detail may be made therein without departing from the spirit and scope of various embodiments as defined by the appended claims. The scope of the embodiments is thus indicated by the appended claims and all changes which come within the meaning and range of equivalency of the claims are therefore intended to be embraced.

What is claimed is:

1. A connection device for the electrical control of at least one lighting means of a vehicle headlight depending on an electrical quantity providable on a vehicle headlight connection of a vehicle, the connection device comprising:
   a vehicle connection for connection to the vehicle headlight connection of the vehicle,
   a lighting means connection for the electrical coupling of the at least one lighting means of the vehicle headlight,
   an on-board power supply system connection for connection to an electrical on-board power supply system of the vehicle,
   a lighting means simulation unit connected to the vehicle connection and to the on-board power supply system connection to detect the electrical quantity and to simulate a predefinable lighting means taking account of the detected electrical quantity on the vehicle connection,
   wherein the lighting means simulation unit has a first adjustment unit to adjust the simulation of the predefinable lighting means; and
   a control unit connected to the lighting means connection and to the on-board power supply system connection to determine a control signal depending on the detected electrical quantity and to control the lighting means depending on the determined control signal.

2. The connection device of claim 1,
   wherein the lighting means simulation unit has a clocked energy converter to simulate the predefinable lighting means.

3. The connection device of claim 2,
   wherein the clocked energy converter is a DC/DC converter.

4. The connection device of claim 1,
   wherein, if the vehicle headlight has more than one lighting means, the connection device has a separate lighting means connection controllable by means of the control unit for the lighting means of the vehicle headlight which is to be controlled.

5. The connection device of claim 1,
   wherein, if the vehicle headlight has more than one lighting means, the connection device has a separate lighting means connection controllable by means of the control unit for each lighting means of the vehicle headlight which is to be controlled.

6. The connection device of claim 1,
   wherein the vehicle connection has a plurality of lighting means channels separated from one another and the lighting means simulation unit is configured to detect respective electrical quantities for each of the lighting means channels on the vehicle connection and to simulate respectively predefinable lighting means on the respective lighting means channels taking account of the respective detected electrical quantities.

7. The connection device of claim 1,
   wherein the electrical quantity is an electrical voltage.

8. The connection device of claim 1,
   wherein the control device is configured to transmit a monitoring signal to the control device.

9. The connection device of claim 1, further comprising at least one delay unit,
   wherein the at least one delay unit is connected to the at least one lighting means connection and the lighting means simulation unit,
   wherein the at least one delay unit is configured to delay the control of the lighting means at least partially for a predefinable time duration depending on the determined control signal.

10. The connection device of claim 1,
    wherein the lighting means simulation unit is arranged such that electrical power drawn from the vehicle headlight connection is fed or absorbed entirely by the lighting means simulation unit.

11. A vehicle headlight for connection to a vehicle headlight connection of a vehicle, with at least one lighting means, the vehicle headlight comprising:
a connection device comprising:
a vehicle connection for connection to the vehicle headlight connection of the vehicle,
a lighting means connection for the electrical coupling of the at least one lighting means of the vehicle headlight,
an on-board power supply system connection for connection to an electrical on-board power supply system of the vehicle,
a lighting means simulation unit connected to the vehicle connection and to the on-board power supply system connection to detect the electrical quantity and to simulate a predefinable lighting means taking account of the detected electrical quantity on the vehicle connection,
wherein the lighting means simulation unit has a first adjustment unit to adjust the simulation of the predefinable lighting means; and
a control unit connected to the lighting means connection and to the on-board power supply system connection to determine a control signal depending on the detected electrical quantity and to control the lighting means depending on the determined control signal.

12. A method for the electrical control of at least one lighting means of a vehicle headlight by means of a connection device electrically coupled to an on-board power supply system of a vehicle in which the at least one lighting means is controlled depending on an electrical quantity provided on a vehicle headlight connection of the vehicle, the method comprising:
detecting the electrical quantity,
simulating a predefined lighting means taking account of the detected electrical quantity on the vehicle headlight connection,
adjusting the simulation based on the predefined lighting means;
determining a control signal depending on the detected electrical quantity,
and
controlling the at least one lighting means depending on the determined control signal.

13. The method of claim 12,
wherein the control of the lighting means is delayed at least partially for a predefinable time duration depending on the determined control signal.

14. The method of claim 12, further comprising:
filtering the detected electrical quantity.

15. The method of claim 12,
wherein the predefined lighting means is simulated by means of an electrical current.

16. The method of claim 15,
wherein the electrical current is detected, compared with a comparative value and the electrical current is adjusted depending on the comparison.

17. The method of claim 16,
wherein the comparative value is defined.

18. The method of claim 12, further comprising:
transmitting a monitoring signal to the control device.

* * * * *